United States Patent Office 3,406,139
Patented Oct. 15, 1968

3,406,139
VINYLIMIDAZOLINE AND VINYLTETRAHYDRO-PYRIMIDINE POLYMERS
Marvin J. Hurwitz, Elkins Park, and Herbert Aschkenasy, Levittown, Pa., assignors to Rohm & Haas Company, Philadelphia, Pa., a corporation of Delaware
No Drawing. Filed Jan. 29, 1963, Ser. No. 254,585
19 Claims. (Cl. 260—29.6)

ABSTRACT OF THE DISCLOSURE

The preparation of polymers of 2-vinyl imidazoline and 2-vinyl-2,4,5,6-tetrahydropyrimidine, their derivatives and salts is described. These polymers are useful in the dewatering of aqueous suspensions of particulate water-insoluble solid materials such as mineral and organic matter.

In an example a suspension of 10.6 pts. polyacrylonitrile (0.2 mole) in 60.1 pts. (1 mole) of ethylene diamine and 0.5 pt. thio-acetamide were heated at 100° C. under $N_2$ for 3.5 hours. The product, poly (2-vinylimidazoline), is isolated by freeze drying or precipitation by a large excess of acetone.

---

This invention is concerned with new vinylimidazoline and vinyltetrahydropyrimidine polymers and processes for making the polymers.

The invention provides 2-vinylimidazoline polymers and 2-vinyl-3,4,5,6-tetrahydropyrimidine polymers. Another aspect of the invention provides derivatives of the vinylimidazoline and the tetrahydropropyrimidine polymers, such as the salts of the polymers, the hydrolyzed 2-vinylimidazoline polymers, and mixtures of all of these polymers. A particularly useful embodiment of the invention provides for water-soluble vinylimidazoline polymers and the water-soluble tetrahydropyrimidine polymers and their salts. An especially useful application of these polymers is the dewatering of aqueous suspensions of particulate, water-insoluble, solid materials, such as minerals and/or organic matter.

By way of definition, the term "polymers" includes both homopolymers and copolymers. The term "vinylimidazoline polymer" includes both the 2-vinyl-3,4,5,6-tetrahydropyrimidine polymer and the 2-vinylimidazoline polymer. The term "water-soluble polymer" includes "water-dispersible" polymer.

The polymer of this invention comprises recurring structural units of the formula

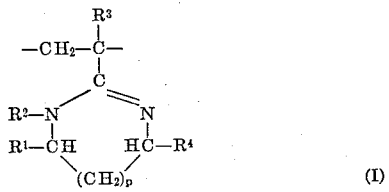

(I)

where $p$ is a number chosen from 0 and 1,
$R^1$ is a hydrogen atom or a hydrocarbon group, such as alkyl, including cycloalkyl, aryl, alkaryl, and aralkyl,
$R^2$ is a hydrogen atom or a hydrocarbon group, such as alkyl, including cycloalkyl, aryl, alkaryl, and aralkyl, or $R^2$ represents $(CH_2CH_2NH)_zH$ when $z$ is an integer of 1 to 4,
$R^3$ is a hydrogen atom, a hydrocarbon group, such as alkyl, including cycloalkyl, aryl, alkaryl, and aralkyl, a halo group, such as chlorine, bromine, a carbalkoxy group, a cyano group, or a haloalkyl group, such as chloroalkyl, and
$R^4$ is a hydrogen atom or a hydrocarbon group, such as alkyl, including cycloalkyl, aryl, alkaryl, and aralkyl.

When $p$ is zero, $R^1$ and $R^4$ may also form, with the adjoined —CH—CH— group of the ring in the formula, a cycloalkyl group containing 5 to 6 carbon atoms in the ring, such as cyclopentyl or cyclohexyl or an aryl group, such as phenyl. Both the cycloalkyl and the aryl group may, in turn, be substituted with alkyl groups such as those having 1 to 4 carbon atoms.

The substituents $R^1$ to $R^4$ may have non-polymerizable olefinic and/or acetylenic unsaturation; generally, however, they are saturated aliphatic or aromatic groups. When $R^1$, $R^2$, and $R^4$ are an alkyl group, generally it does not have more than 18 carbon atoms, more specifically 1 to 4 carbon atoms; when these substituents are an aryl group, generally it does not contain more than 14 carbon atoms, more specifically six carbon atoms. When $R^3$ is an alkyl group, generally it does not exceed 4 carbon atoms, more specifically 1 carbon atom, and when an aryl group, generally it does not exceed 6 carbon atoms.

In $R^1$, $R^2$, $R^3$ and $R^4$ the hydrocarbon group may be any straight or branched chain alkyl, such as methyl, ethyl, butyl, isopropyl, hexyl, isodecyl, hexadecyl, octadecyl, or it may be phenyl, benzyl, ethyl benzyl, phenyl ethyl, and the like.

The polymer of the invention may comprise recurring vinylimidazoline units, in which case $p$ equals zero; or, the polymer may contain recurring vinyltetrahydropyrimidine units, in which case $p$ equals 1; and the polymer may comprise both vinylimidazoline and vinyltetrahydropyrimidine units, in which case the polymer will have recurring units in which $p$ is zero and others in which $p$ is 1. The substituents $R^1$, $R^2$, and $R^4$ may all be the same or they may be different on each recurring vinylimidazoline or vinyltetrahydropyrimidine unit; moreover, the substituents $R^1$, $R^2$, and $R^4$ may be the same or different from one unit to another. Also, $R^3$ need not be the same throughout the polymer.

The linear polymer of the invention is derived from, and comprises a vinyl backbone of a nitrile-containing polymer especially one having units of the formula,

(II)

The polymer may be a homopolymer or it may be a copolymer. Either one or both of the hydrogen atoms on the $CH_2$ group in Formula II may be substituted with fluorene groups or cyano groups, which latter groups may also be changed into imidazoline groups when the acrylonitrile type polymer is reacted with the polyamine.

In the polymer of this invention, the relationship between recurring units of Formula I and of other monomers may vary widely. The polymer of the invention may have 100 mole percent of the recurring units defined in Formula I. Moreover, the polymer of the invention may have only traces or a few units defined in Formula I, the balance being made up of one or more other monomers. Generally, the polymer of the invention comprises at least 10 mole percent of the recurring structural units of the Formula I, the balance being made up with units of one or more other monomers. While the exact proportion of the recurring units of Formula I will generally depend on the application desired for the polymer, the polymer of the invention often comprises at least 50 mole percent of recurring units of Formula I and when the fullest benefits of the recurring units of Formula I are desired, the polymer of the invention preferably comprises at least 90 mole percent of the recurring units of Formula I.

Another embodiment of the invention provides polymers, herein named poly - N - aminoalkylacrylamides, which comprise at least one recurring unit of the formula

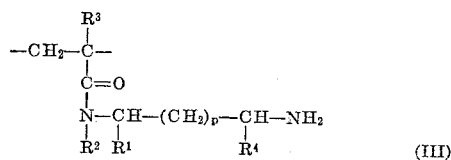

and/or

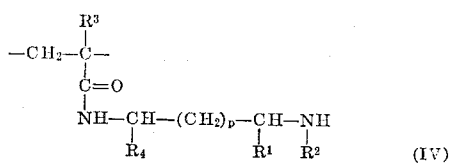

wherein $p$, $R^1$, $R^2$, $R^3$, and $R^4$ are defined above. These polymers can occur in one form, as III or as IV, or in mixtures of III and IV. These poly-N-aminoalkylacrylamides are obtained by the hydrolysis of the vinylimidazoline and vinyltetrahydropyrimidine polymers of the invention.

The polymer comprising the N-aminoacrylamide units may occur in mixtures with the polymer comprising the vinylimidazoline units or both types of units may be present in a copolymer; such is the case where the polyvinylimidazoline is in the partially hydrolyzed state. The N-aminoalkylacrylamides are useful polymers for a number of applications. They are useful in the treatment of aqueous suspensions. Also, they are useful as starting materials for cross-linked resins, which in turn can be used in various applications, such as thermoset coatings, and the like.

A further embodiment of the invention provides salts of polymers comprising the vinylimidazoline groups and of those having the N-aminoalkylacrylamide groups. The polyvinylimidazoline salts may be represented by the formula

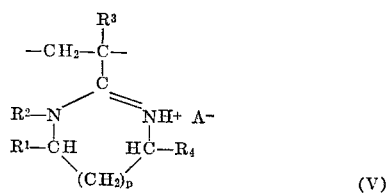

in which $A^-$ is an anion, that is a negative salt forming ion or radical. Examples of such negative ions or radicals include halides, such as chloride, bromide, and iodide, sulfate, sulfite, bisulfite, methyl sulfate anion, bisulfate, acetate, tartrate, propionate, biphosphate, citrate, phosphate, sulfonate, oxalate, ethylenediaminetetraacetate, and so on.

The poly-N-aminoalkylacrylamide salts may be represented by the formula

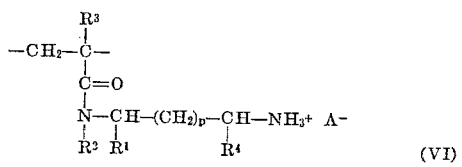

and/or

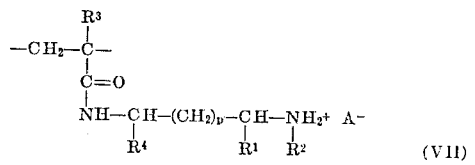

in which $A^-$ has been defined above.

The polymers of the invention are obtained by a process which comprises reacting a polymer, that is, a homopolymer or copolymer, of nitrile group-containing monomers, and especially a polymer containing units of Formula II hereinabove, with a polyamine.

The polymer reactants containing nitrile groups, and especially units of Formula II which are used in this invention are polymers of nitrile-containing monomers, such as acrylonitrile, methacrylonitrile, other α-substituted acrylonitriles, cyanostyrenes, α-cyanoacrylate, cyanobutadienes, and the like. Of these, polyacrylonitrile is preferred because it gives an optimum balance of desirable properties in the final polymer.

Polymerizable materials that can be copolymerized with a nitrile containing monomer to form a copolymer reactant containing nitrile groups such as one containing units of Formula II hereinabove, are the following: vinyl aromatic and isopropenyl aromatic compounds, more particularly the different vinyl aromatic and isopropenyl aromatic hydrocarbons (e.g., the various dialkyl styrenes, isopropenyl toluene, etc.), other aliphatic compounds containing a vinylidene grouping, e.g., maleates and fumarates, maleic acid anhydride, α-methylstyrene, vinyl butyl ether, vinyl chloride, vinylidene chloride, itaconic acid anhydrides and esters, citraconic anhydride and esters, the various substituted acrylamides (e.g., methacrylamide, ethacrylamide, the various N-substituted acrylamides and N-substituted alkacrylamides, for instance, N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl chloroacetate, vinyl propionate, vinyl butyrate, vinyl isobutyrate, vinyl valerate, vinyl acrylate, vinyl methacrylate, etc., esters of an acrylic acid, e.g. esters of the formula

in which $R°$ is a hydrogen or a methyl group, and $R^x$ is generally an alkyl group of 1 to 18 carbon atoms; the various α-substituted acrylic acids, e.g., methacrylic acid, ethacrylic acid, phenylacrylic acid, etc.; the alkyl esters of an acrylic acid, e.g., the ethyl, propyl, isopropyl, n-butyl, isobutyl, sec-butyl, tert-butyl, amyl, hexyl, heptyl, octyl, decyl, dodecyl, etc., esters of acrylic, methacrylic, ethacrylic, phenylacrylic, also amino-substituted alkyl acrylates and methacrylates, ureido and other substituted alkyl acrylates and methacrylates, etc., allyl amine, methallyl amine, vinyl ethyl ether, allyl benzene, as well as other viny aromatic and vinyl aliphatic compounds, and the like. Two, three, four, five, or any desired higher number of monomers can be admixed and copolymerized with the nitrile-containing monomer in accordance with the present invention.

The polymer reactant containing nitrile groups such as one containing units of Formula II hereinabove, is reacted with a polyamine to form the vinylimidazoline and vinyltetrahydropyrimidine polymers of the invention. Typical polyamines which may be reacted with the nitrile-containing polymer reactant are diamines of the formula

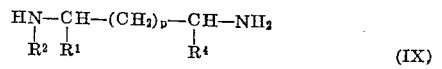

wherein the symbols, $p$, $R^1$, $R^2$, and $R^4$ are defined in conjunction with Formula I above. Typical amines are the following: ethylenediamine, N-alkyl substituted ethylenediamine, such as N-methylethylenediamine, N-butylethylenediamine, N-phenylethylenediamine, N-benzylethylenediamine, 1,2-diaminopropane, 1,2-diaminobutane, 1,2-diaminohexane, 2,3-diaminobutane, 2,3-diamino-pentane, 3,4-diaminohexane, 1,3-diaminopropane, N-methyl-1,3-diaminopropane, N-butyl-1,3-diaminopropane, N-phenyl-1,3-diaminopropane, 1,3-diaminobutane, 1,3-diaminoheptane, 2,3-diamino-2,3-dimethylbutane, 2,3-diaminohexane, 1,2-diaminocyclohexane, o-phenylenediamine, o-xylylenediamine, o-tolylenediamine, o-tolidine, and linear polyamines of the formula

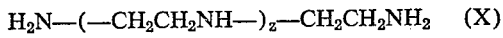

where $z$ is an integer of 1 to 4, such as diethylenetriamine, triethylenetetraamine, tetraethylenepentaamine, pentaethylenehexaamine, and the like.

The reaction of mixtures of such polyamines with the polymer reactant yields vinylimidazoline and/or vinyltetrahydropyrimidine polymers in which the $R^1$, $R^2$, and $R^4$ groups in an individual vinylimidazoline and vinyltetrahydropyrimidine units is not the same and this is independently of whether $p$ is 0 or 1.

The polymers of the invention are made by a process which comprises reacting at least one polyamine of the formula given above with an acrylonitrile type polymer. In such a process, the amine may be used, preferably in more than stoichiometric amount. In such a case, it plays the role of both a suspending liquid medium for the initial polymer and as a reactant therefor. When a stoichiometric or less than such a stoichiometric amount is used, the reaction tends not to be complete. Generally, there are used 5 moles of polyamine per mole of polymer. The reaction temperature is generally maintained in the range of 90° to 120° C. The progress of the reaction may be determined by the evolution of ammonia. At the completion of the reaction, the polymer product, in solution in the diamine, is recoverable therefrom by any suitable method as by freeze drying, or precipitation from a solution, e.g., an aqueous solution of the polymer. After drying, the solid polymer product is generally in a particulate state; it may be finely sub-divided as by grinding, to give a powdery polymer. In this form, the polymer is ideally suited for many of its applications.

Another embodiment for making the polymers of the invention comprises reacting the polymer reactant containing nitrile groups such as one containing units of Formula II hereinabove, in solution, with the polyamine. Any solvent for the polymer may be used. Typical are the following: dimethylacetamide, dimethylformamide, dimethylsulfoxide, ethylene carbonate, and tetramethylenesulfone. It will be appreciated that other solvents for the polymer are available for use. The amount of solvent used is influenced by practical consideration. A readily stirrable mixture of the polymer is preferred. In other respects, the procedure follows that described for the process in the absence of the solvent.

Another embodiment for making the polymers of the invention comprises reacting the polymer reactant containing nitrile groups, such as one containing units of Formula II hereinabove, with the polyamine in the presence of a non-solvent. It is most desirable that the non-solvent be a non-solvent for the initial polymer and the resulting polymer. It is also desirable that the non-solvent be a poor or a non-solvent for the polyamine reactant. Generally, the non-solvent is liquid at room temperature (25–30° C.), but it is sufficient if it is a liquid at the temperatures of reaction between the initial polymer and the polyamine. Typical non-solvents are aliphatic, either acyclic or alicyclic, aromatic or naphthenic hydrocarbons. Mixtures of the various hydrocarbons may be employed. Illustrative useful hydrocarbons include n-hexane, cyclohexane, cyclohexene, methylcyclohexane, n-heptane, n-octane, iso-octane, benzene, xylene (o-, m-, or p-xylene). Commercially available hydrocarbon mixtures may be employed such as mineral spirits, gasoline, xylene mixtures, terpenes, solvent naphthas of aromatic, aliphatic or naphthenic character, alkyl benzenes in which the alkyl group or groups have from 1 to 4 carbon atoms, octane fractions which contain a mixture of octane isomers and so on. Ideally, the non-solvent is such that its boiling temperature range favors recovery of excess diamine reactant by formation of a recoverable azeotropic mixture comprising excess reactant and non-solvent. Although such temperature range may vary widely depending on the nature of the reactants, a suitable non-solvent may have a boiling temperature in the range of 60° to 150° C., preferably 80° to 120° C. And also, its polarity will not exceed that of xylene. The amount of non-solvent used is influenced by practical considerations. A readily stirrable mixture of the polymer is preferred. In other aspects, the procedure for making the polymers of the invention containing units of Formula I follows that described for the process in the absence of non-solvent. If desired, in all the various embodiments for making the polymers of the invention, the polyamine may be added incrementally to the reactive polymer.

In a further refinement of the invention, it has been found that the process for making the polymer of the invention may be carried out advantageously with a colloidal silica or a silica compound, typical of which are various clays and silicates.

It has been further found that the reaction between amine and polymer reactant containing nitrile groups such as one containing units of Formula II hereinabove, is preferably promoted by the use of a catalyst which is a molecule comprising at least one atom selected from the Group VI-A of the Periodic Table and having an atomic weight from 32 to 130, such as sulfur, selenium, and tellurium.

Preferably, the catalyst is one capable of forming an acidic thiol group under the reaction conditions. Suitable catalysts include the following, alone or in combination: elemental sulfur, alkali metal sulfides, such as sodium or potassium sulfide, and other metal sulfides, sodium hydrogen sulfide, thiobenzoic acid, thioacetic acid, thioacetamide, thiobenzanilide, phosphorous pentasulfide, thioglycolic acid, thiopropionic acid, dithiooxamide, hydrogen sulfide, ammonium sulfide, hydrogen selenide, selenium sulfide, hydrogen telluride, tellurium sulfide, and similar others.

The amount of catalyst may range from a catalytic amount, i.e., the smallest amount capable of promoting the reaction to that amount which gives no further advantage. Practical amounts include 0.1 to 5% by weight of the polymer. The sulfur may be used as elemental sulfur or various types of the sulfur catalyst can be used in mixtures. Also, the catalyst may be used in conjunction with a compound which, in conjunction with the catalyst, is capable of generating hydrogen sulfide.

The reaction temperature of the polyamine with the polymer reactant containing nitrile groups such as one containing units of Formula II hereinabove, is preferably maintained in the range of 75° C. to the boiling point of the amine and short of the decomposition of the polymer reactant. Generally, the temperature is between 75° to 120° C., more preferably in the range of 80° to 115° C. Below 50° C., the reaction is generally unduly slow. The reaction may, alternatively, be run under pressure.

The polymers of this invention containing units of Formula I can be tailored to fit the particular application intended, from the lowest possible molecular weight that can be designated as a polymer to extremely high molecular weight polymers. Generally, these polymers may vary in molecular weight from an average molecular weight of at least 500 to ten million, or even fifty million. For certain applications, such as for water treatment, the preferred molecular weight may range from 50,000 to ten million; in special cases, these may even range to fifty million. For other applications, as for coatings, lower molecular weight polymers, as of 20,000 to 150,000 may be preferable.

A particularly favorable class of polymers are those containing units of Formula I which are water-soluble. Such water-soluble polymers are preferably essentially completely linear although sometimes they may contain as much as 10 mole percent of cross-linked molecules.

Starting with water-soluble polymers, the hydrophobic character of the polymer can be increased by including in the initial polymer reactant containing nitrile groups, such as one containing units of Formula II hereinabove, hydrophobic monomers which impart increasingly hydrophobic characteristics to the final polymer. By a proper balance of hydrophobic and hydrophilic portions, a polymer is obtained which can be water-dispersible or water-soluble, as desired. The water-dispersible polymers have various utilities, such as in spinning operations, where they may be used as dopes, as co-reactants in mixtures of resins for the treatment of non-woven fabrics, in other applications in the textile fields and in paints. By increasing the hydrophobic character of the polymer, the polymer will become more soluble in solvents and such solvent-soluble polymer may be useful in the solution coating field.

The polymers of the invention containing units of Formula I are useful in the preparation of their corresponding salts. The salts are prepared by treating the polymers of the invention with an acid. For this purpose, any acid may be used, organic or inorganic. It is preferred that the acid be a strong acid. Typical acids are sulfuric, hydrochloric, phosphoric, nitric, sulfamic, oxalic, acetic, glycolic, diglycolic, sulfonic, benzene sulfonic, para-toluene sulfonic, ethylene diamine tetraacetic acid, and other similar acids. Rather than using an acid, there may also be used the acid salt thereof, such as the ammonium sulfate and sodium acid phosphate salts. With solid acids, an aqueous reaction medium is suitable.

The salts of the polymers containing units of Formula I may be mixtures of the salt with the free base from which the salt is derived or they may be completely in the salt form. A distinct advantage of the salts is that they are both water-soluble and have increased stability against hydrolysis. By virtue of this characteristic, they do remain in solution in the aqueous suspension to be treated without cross-linking, essentially indefinitely.

The polymers of the invention containing units of Formula I may be converted to the poly-N-aminoalkylacrylamides described in Formulas VI and VII. These aminoalkylacrylamides are obtained by a method which comprises treating the polymers containing units of Formula I dispersed or dissolved in an aqueous medium with an alkali at a pH above 7, generally of at least 8 and preferably over 12. Any base is useful for such purposes, such as strong inorganic bases, like the alkali metal hydroxides, alkali metal alkoxides, such as potassium hydroxide, sodium hydroxide, and the like. The poly-N-aminoalkylacrylamides are also obtainable by hydrolyzing the polyvinylimidazolines with strong aqueous inorganic or organic acids. Typical useful acids include sulfuric, phosphoric, nitric, para-toluenesulfonic acid, and the like.

Generally, the poly-N-aminoalkylacrylamides contain at least 1 residual group of Formula I in the polymer; generally they will contain at least 10 mole percent of such residual groups. The poly-N-aminoalkylacrylamides in turn are useful for the preparation of the corresponding salts by a treatment corresponding to that whereby the salts of the polymers containing units of Formula I are obtained.

The poly-N-aminoalkylacrylamides of this invention are, furthermore, useful in all the applications for which the polymers of the invention containing units of Formula I are useful. They are useful as coagulants and as filtration aids in the clarification and treatment of aqueous suspensions of finely divided water-insoluble solid materials, both minerals and/or organic. Also, the poly-N-aminoalkylacrylamides of the invention are useful as resins, in particular for thermoset coatings, textiles, and similar applications. They can be cross-linked by heating to firm, insoluble hard coatings.

The N-aminoalkylacrylamide polymers of the invention have other utilities, such as resins to increase the wet strength of various substrates, anchoring agents for the beater deposition of emulsions onto pulp and as pigment retention aids, as thickener or coagulant for rubber latices, as emulsion stabilizers for paints, binder for non-woven materials, and any other uses for which the polymers of the invention containing units of Formula I are useful.

Another interesting and useful derivative of the polymers of the invention containing units of Formula I and the N-aminoalkylacrylamide polymers of the invention are metal-polymer complexes. These may be water-soluble or water-insoluble depending on the nature of the polymer and the nature of the salts. The metal polymer complexes are formed by treating an aqueous solution of these polymers with one or more metal ions, and thereby forming a water-insoluble precipitate of metal and polymer complex. Its composition may vary from a gel to a brittle solid, with other variants of these compositions. Any metal ion forms such complexes, typical ones being: $Ag^+$, $Fe^{+++}$, $Ni^{++}$, $Sn^{++}$, $Hg^{++}$, $Zn^{++}$, $Co^{++}$, and $Cu^{++}$. With colored ions, colored polymer complexes are formed. Treatment of the complex with or in a basic solution, obtained with any suitable organic or inorganic base, such as ammonia, brings about a dissociation of the complex to the polymer and the metal ions. Drying of the ammonia thermally or by other convenient methods regenerates the complex. This may be useful in coatings, such as floor polishes, and the like.

The polymers of the invention form quaternary derivatives by a method comprising treating the polymers with alkyl halides or other reactive halides, such as phenacyl.

The polymers of the invention are effective flocculation agents of suspended matter in liquid media, especially in aqueous media.

In numerous mineral dressing operations, it is necessary to separate water from an aqueous suspension of inorganic or mineral matter, such as clays, finely divided precipitates and the like, having an extremely fine state of sub-division from less than one micron to about 50 microns. The pH of such suspensions may vary widely from 0 to 9 or more. Settling of suspended matter from such suspensions is extremely slow so that it is generally the practice to add a flocculating agent, such as glue, acids, starches, and various natural gums, to cause the individual particles to flocculate by some interaction with the molecules of the flocculating agent in order to reduce the holding time in settling basins or vessels before decantation of the supernatant liquor can be carried out. Similarly, removal of water from such suspensions by filtration is frequently aided by the addition of a flocculant to avoid the rapid development of an impermeable filter cake through which filtration can be effected only at extremely slow rates and/or under extremely high pressures. The practice in conventional operations remains to use inorganic materials, generally a combination of ferric chloride and lime, for the treatment of sludges containing organic matter in suspension. A large proportion of the inorganic treating materials are used amounting to from 2% to 15% of ferric chloride in conjunction with about 5% to 40% of lime. A quite common practice is to use a mixture of 3% ferric chloride and 6% lime based on suspended solids. The polymers of the invention are also useful in air flotation operations and also in centrifugation processes. By flocculation of the solids, the flocculated particles can be more efficiently floated or centrifuged.

To carry out the process of the invention of dewatering of aqueous suspensions of finely divided water-insoluble materials, there is added into the aqueous suspension comprising suspended matter, organic and/or inorganic, to be flocculated, 0.001% to 5%, based on the weight of the suspended matter of the water-soluble linear polymer hereinabove defined when the suspended matter is essentially mineral in character, and from 0.001% to 5% by weight of the polymer, based on the weight of suspended matter when it is of predominantly organic character, as in the case of a sewage sludge. This amount may vary broadly since it depends on the nature and amount of suspended matter present that is desired to be removed from the water. Also, the amount of polymer needed is relative to the speed of flocculation desired to be attained, the larger amounts being generally conducive to faster dewatering. Moreover, the precise amount of flocculant added may depend upon the particular system and frequently depends upon the size of the particles to be flocculated or the surface area thereof. For example, bentonite particles have extremely high surface areas and, when the suspended matter contains a large proportion thereof, the suspensions may require, apparently on that account, as much as 1% to 3% by weight (based on the weight of suspended matter) of the flocculating agent to produce optimum results. For most systems encountered in ore-dressing operations, however, the preferred proportions of flocculant are from 0.01 to 0.2% by weight of the suspended matter. When the suspended matter is predominantly organic, 0.001% to 5% by weight of polymer based on the weight of the suspended matter is suitable; when the suspended matter is essentially mineral in character, 0.001% to 5% by weight of polymer based on the weight of the suspended matter is suitable.

After introduction of the flocculating agent, the suspension may be allowed to settle and then decanted or the suspension may be filtered or the suspension may be separated by filtration or centrifugation. The use of the flocculating agents of the present invention has been found to increase the sedimentation rate, the filtration rate, the centrifugation rate, and the flotation rate.

Also, the flocculating agents of the present invention are useful for facilitating the dewatering of many aqueous suspensions of organic materials whether the suspended matter is entirely organic or is a mixture of organic with inorganic materials in which the organic portion predominates by weight. Examples of such aqueous suspensions include industrial wastes, such as those discharged from dairies and canneries, distillery wastes, fermentation wastes, wastes from paper-manufacturing plants, wastes from dyeing plants, sewage suspensions such as any type of sludge derived from a sewage treatment plant, such as a digested sludge, an activated sludge, a raw or primary sludge or mixtures thereof. The filtration and sedimentation of such waste materials are generally complicated by the fact that they are rather complex in character and may include combinations of finely divided organic and/or inorganic materials which are relatively inert in conjunction with finely divided hydrophilic organic matters which are in swollen conditions and thereby tend to interfere with filtration and make the drying of either a filter cake or sediment cake practically impossible. They may also contain, besides hydrophilic polymeric materials, which swell and give the difficulties just mentioned, surface active agents such as detergents, dispersing agents and protective colloid agents, all of which tend to maintain the material in suspended condition and enhance the problems encountered in filtering and/or sedimentation.

The following examples are provided by way of illustration of the invention and not by way of limitation. All parts are by weight.

Example 1

A suspension of 10.6 parts polyacrylonitrile (0.2 mole) in 60.1 parts (1 mole) of ethylenediamine containing 0.5 part thioacetamide is heated with stirring under nitrogen at 100° C. for 3.5 hours. The reaction mixture passes through a swollen semi-solid stage, but on continued heating becomes a viscous, green liquid. At the completion of the reaction, 95% of the theoretical quantity of ammonia has evolved. The product, poly(2-vinylimidazoline), is isolated by freeze drying of the ethylenediamine solution or precipitation into a large excess of acetone aided by efficient stirring. The product may be dried and converted to a finely divided form as by grinding. The product, a solid, is soluble in water.

Example 2

96 parts of poly(2-vinylimidazoline) of Example 1 is dissolved in 98 parts of aqueous (10%) sulfuric acid, and precipitated in acetone; decanting gives a water-soluble solid, the polyvinylimidazoline sulfate. The product is useful in the dewatering of ore suspensions.

Example 3

The polyvinylimidazoline is converted to its corresponding poly-N-aminoalkylacrylamide by taking the product of Example 2, adjusting the pH to 12 with sodium hydroxide, heating it at 50° C. for five days. Quantitative conversion is obtained. The product is precipitated in acetone giving a solid polymer.

Example 4

To a solution of 10 parts (0.188 mole of nitrile) of polyacrylonitrile dissolved in 125 ml. dimethylformamide is added 24 parts (0.4 mole) of ethylenediamine and 0.5 part of thioacetamide. The reaction mixture is then heated in an oil bath at 110° C. under nitrogen. The exit gases are collected in a water trap and the progress of the reaction, as measured by ammonia evolution, is followed in this manner. After 4 to 5 hours, 95% of the theoretical quantity of ammonia is obtained. The red viscous solution is poured through a coarse filter into a ten-fold excess of stirred acetone. The product, polyvinylimidazoline, is obtained as a light yellow precipitate in greater than 90% yield.

Example 5

The hydrochloride of the polyvinylimidazoline of Example 4 is prepared by dissolving the polymer in aqueous hydrochloric acid and precipitating it in acetone. The product obtained is water-soluble. It is useful in making films for coatings.

Example 6

The polyvinylimidazoline is converted to its correspond-poly-N-aminoalkylacrylamide by dissolving it in hydrochloric acid, adjusting the pH to 12, boiling for three hours the solution of the aminoamine. The solution of the polyalkylaminoamide-polyvinylimidazoline is useful directly in water treatment.

Example 7

A suspension of 8.85 parts of a copolymer of acrylonitrile and ethyl acrylate (60:40 weight percent) containing 5.306 parts (0.1 mole) of acrylonitrile in 60.1 parts (1 mole) of ethylenediamine containing 0.212 part of sulfur (4% based on the weight of acrylonitrile) is heated with stirring under nitrogen at a temperature of 105°–110° C. for four hours. At the lapse of that time, 95% of the theoretical quantity of ammonia has evolved. The vinylimidazoline copolymer product is isolated by precipitation with acetone as a solid which is soluble in water.

Treatment of 100 ml. suspensions of 10% Rutgers Soil (Rutgers Soil is: 20% sand, 58% silt, 22% clay) with 0.025% of this polymer on the weight of solid in the suspension causes an improvement in the settling of the soil and an increase in the sediment volume as compared to the treatment with equivalent quantities of ferric chloride and calcium hydroxide.

The polymer is useful as a thickener for industrial acid solutions and for some latex systems, such as aqueous base paints.

Example 8

A suspension of 26.45 parts of a copolymer of acrylonitrile and ethyl acrylate (40:60 weight percent) containing 10.61 parts (0.2 mole) of acrylonitrile in 60.1 parts (1 mole) of ethylenediamine containing 0.424 part of sulfur (4% based on the weight of acrylonitrile) is heated with stirring under nitrogen at a temperature of 105°–110° C. for four hours. Seventy-five percent of the theoretical quantity of ammonia is evolved. The vinylimidazoline copolymer product is a solid.

Example 9

The polyvinylidimidazoline oxalic salt is prepared by dissolving the polymer of Example 8 in excess aqueous oxalic acid and precipitating from acetone, giving the solid oxalate salt.

Example 10

A suspension of 18.03 parts of a copolymer of acrylonitrile and styrene (58.9:41.1 weight percent) containing 10.6 parts (0.2 mole) of acrylonitrile in 120.2 parts (2 mole) of ethylenediamine containing 0.424 part of sulfur (4% based on the weight of acrylonitrile) is heated with stirring under nitrogen at a temperature of 105°–110° C. At the end of three hours and ten minutes, 80% of the theoretical amount of ammonia is evolved. Upon further heating to eighteen hours, there is recovered 107% of the theoretical amount of ammonia. The vinylimidazoline copolymer product is a solid which is soluble in water.

When an activated sludge suspension containing 6000 p.p.m. of suspended solids is treated with 0.10–1.0% of the above polymer, rapid flocculation and settling of the solids occurs and clearer supernatants are obtained.

Example 11

The polyvinylimidazoline sulfamic acid salt is prepared by dissolving the polymer of Example 10 in aqueous sulfamic acid and precipitating with acetone. The product is a solid.

Example 12

A suspension of 19.9 parts of a copolymer of acrylonitrile and acrylamide (53.3:46.7 weight percent) containing 10.6 parts (0.2 mole) of acrylamide in 120.2 parts (2 mole) of ethylene diamine containing 0.424 part of sulfur (4% based on the weight of the acrylonitrile) is heated with stirring under nitrogen at a temperature of 105°–110° C. for five and a half hours. Upon the lapse of that time, 160% of the theoretical quantity of ammonia has evolved. Upon further heating to twenty-five and a half hours, there is recovered 175% of the theoretical amount of ammonia. The vinylimidazoline copolymer product is soluble in water.

The filtration of 10% clay slurries is improved by the addition of 0.05 to 0.1% of this polymer on the weight of the clay.

Example 13

A suspension of 12.18 parts of a copolymer of acrylonitrile and vinyl acetate (87.1:12.9 weight percent) containing 10.6 parts (0.2 mole) of acrylonitrile in 120.2 parts (2 mole) of ethylenediamine containing 0.424 part of sulfur (4% based on the weight of acrylonitrile) is heated with stirring under nitrogen at a temperature of 105°–110° C. for three hours and twenty minutes. Upon the lapse of that time, 102% of the theoretical quantity of ammonia has evolved. The vinylimidazoline copolymer product is a solid which is soluble in water.

The vinylimidazoline copolymer forms clear films.

It is useful in the treatment of digested sewage sludge. Portions of 100 cc. of sludge containing 1 to 5% of suspended solids and having a pH of 7.0, when treated with 1 to 5% based on the weight of suspended solids of this polymer undergo a settling of the suspended solids and clarification of the liquid.

Example 14

A suspension of 16.35 parts of a copolymer of acrylonitrile and vinyl butyl ether (64.8:35.2 weight percent) containing 10.6 parts (0.2 mole) of acrylonitrile in 60.1 parts (1 mole) of ethylenediamine containing 0.424 part thioacetamide (4% based on the weight of acrylonitrile) is heated with stirring under nitrogen at a temperature of 105°–110° C. for two hours. After that time, 98% of the theoretical quantity of ammonia has evolved. The product, vinylimidazoline copolymer, is a solid which is soluble in water.

The product is useful in water treatment.

Example 15(a)

A suspension of 13.4 parts of polymethacrylonitrile (0.2 mole) in 120.2 parts of ethylenediamine (2 moles) containing 0.536 part of thioacetamide (4% based on the weight of the polymer) is heated under nitrogen at 105°–110° C. for twenty-four hours and forty minutes during which time 108% of the theoretical quantity of ammonia has evolved. The 2-isopropenylimidazoline polymer is useful as a sequestering agent and ion-exchange medium.

Example 15(b)

Part (a) is repeated substituting thioacetamide by an equivalent amount of potassium sulfide.

Example 16

A suspension of 10.6 parts of polyacrylonitrile (0.2 mole) in 74.13 parts (1 mole) of 1,3-propanediamine containing 0.424 part of thioacetamide (4% based on the weight of the polymer) is heated under nitrogen for three hours and fifty minutes at a temperature range of 105°–110° C. by which time 102% of the theoretical amount of ammonia has evolved. The polymer product, poly-2-vinyl-3,4,5,6-tetrahydropyrimidine, is soluble in water. It is useful in water treatment.

Example 17

Following the procedure of Example 16, there are reacted 10.6 parts (0.2 mole) of polyacrylonitrile in 74.3 parts (1 mole) of 1,2-propanediamine containing 0.424 part thioacetamide (4% based on the weight of the polymer). The mixture is heated at 105°–110° C. for two hours; there is evolved 100% of the theoretical amount of ammonia. The polymer product, poly-2-vinyl-4(or 5)-methylimidazoline, is soluble in water. It is useful in water treatment.

Example 18(a)

Following the procedure of Example 16, there are reacted 5.3 parts (0.1 mole) of polyacrylonitrile in 50 parts (0.676 mole) of N-methylethylenediamine containing 0.212 part of thioacetamide (4% based on the weight of the polymer). The mixture is heated at 105°–110° C. for five and a half hours; there is evolved 105% of the theoretical amount of ammonia. The polymer product, poly-2-vinyl-N-methylimidazoline, is soluble in water. It is useful in water treatment.

Example 18(b)

Part (a) is repeated substituting thioacetamide by an equivalent amount of thiopropionic acid.

Example 19

Following the procedure of Example 16, there are reacted 16.93 parts of a copolymer of acrylonitrile, styrene, and ethyl acrylate (62.6 weight percent of acrylonitrile), corresponding to a content of 10.6 parts (0.2 mole) of acrylonitrile, with 120.2 parts (2 mole) of ethylenediamine containing 0.424 part thioacetamide (4% based on the weight of the acrylonitrile). The mixture is heated at 105°–110° C. for five hours and thirty-five minutes; there is evolved 99% of the theoretical amount of ammonia. The polymer product, a copolymer of styrene, ethyl acrylate, and 2-vinylimidazoline, is partly soluble in water. It is useful in molding compositions.

Example 20(a)

To a reaction flask, there are charged 18.03 parts (0.2 mole) of a copolymer of acrylonitrile and styrene (58.9: 41.1 weight percent) and 0.1436 part of sulfur in 200 ml. of dimethylsulfoxide. To the stirring mixture, there are added dropwise over a 10–15 minute period 38.1 parts (0.52 mole) of 1,2-diaminopropane. The reaction mixture is then heated to 105° to 110° C. When 97% of the theoretical amount of ammonia has collected, the reaction is discontinued and the solid product stripped at 60° C. under vacuum.

Example 20(b)

The procedure of Example 19 is followed for the preparation of the polymer, but thioacetamide is substituted by an equivalent amount of hydrogen telluride.

Example 20(c)

The procedure of Example 19 is followed for the preparation of the polymer, but thioacetamide is substituted by an equivalent amount of hydrogen selenide.

Example 20(d)

The procedure of Example 19 is followed for the preparation of the polymer, but thioacetamide is substituted by an equivalent amount of thiopropionic acid.

Example 21

Following the procedure of Example 20, there are mixed 13.4 parts (0.2 mole) of polymethacrylonitrile and 0.6768 part (0.4% based on the weight of the product expected) of sulfur in 200 cc. of tetramethylene sulfone. To the cold solution, there are added 34 parts (0.46 mole) of 1,2-propanediamine. The reaction mixture is heated at 105°–110° C. until 88% of the theoretical amount of ammonia is collected. The 2-(isopropenyl)-3-methylimidazoline polymer is insoluble in water.

Example 22(a)

Following the procedure of Example 20, there are mixed the following: 12.18 parts (0.2 mole) of a copolymer of acrylonitrile and vinyl acetate (87.1:12.7 weight percent), corresponding to a content of 10.6 parts of acrylonitrile, and 0.0768 part of sulfur in 200 cc. of ethylene carbonate. The solution is heated and there are added 32.5 parts (0.44 mole) of N-methylethylenediamine dropwise. The temperature is maintained at 105°–110° C. during the entire reaction period until 103% of the theoretical quantity of ammonia is collected. The solid polymer product is stripped at 60° C. under vacuum.

Example 22(b)

Part (a) is repeated substituting the sulfur by an equivalent amount of sodium sulfide and sulfurous acid.

Example 23

To a reaction flask, there are charged 16.35 parts of a copolymer of acrylonitrile and vinyl butyl ether (64.8:35.2 weight percent), corresponding to a content of 10.6 parts (0.2 mole) of acrylonitrile, containing 0.1436 part sulfur, and 200 cc. of dimethylformamide. To the mixture, there are added dropwise 34.5 parts (0.46 mole) of 1,3-diaminopropane. The reaction mixture is then heated to 105°–110° C. When 91% of the theoretical amount of ammonia has collected, the reaction is discontinued. The tetrahydropyrimidine copolymer product is stripped at 60° C. under vacuum.

Example 24(a)

To a reaction flask, there are charged 15.15 parts of a copolymer of acrylonitrile and trimethylcyclohexyl acrylate (70:30 weight percent), corresponding to a content of 10.6 parts (0.2 mole) of acrylonitrile, 0.0768 part of sulfur, and 200 cc. of dimethylacetamide. To the stirring, cold mixture, there are added dropwise over a 10–15 minute period 27.6 parts (0.46 mole) of ethylene diamine. After 21 and a half hours, 89% of the theoretical amount of ammonia has collected.

The vinylimidazoline copolymer product melts at 250°–262° C. with evolution of gas. It is partly soluble in 1 N hydrochloric acid. The product is useful in aiding dye receptivity in emulsion spinning of polyacrylonitrile.

Example 24(b)

Part (a) is repeated substituting sulfur by sodium sulfide and acetic acid.

Example 25

To a reaction flask, there are charged 16.93 parts of a copolymer of acrylonitrile, styrene, and ethyl acrylate (62.6 weight percent), corresponding to a content of 10.6 parts (0.2 mole) of acrylonitrile, 0.1436 part of sulfur, and 200 cc. of 1,3-diaminopropane. The stirring mixture is then heated to reflux. When 90% of the theoretical amount of ammonia has been collected, the reaction is discontinued. The vinyltetrahydropyrimidine copolymer product is stripped and dried.

Example 26

To a reaction flask, there are charged 16.3 parts of a copolymer of acrylonitrile and styrene (64.1:35.9 weight percent), corresponding to a content of 10.6 parts (0.2 mole) of acrylonitrile, 0.2304 part of sulfur, and 200 cc. of dimethylformamide. To the stirring, hot mixture, there are added dropwise 59.5 parts (0.52 mole) of 1,2-diaminocyclohexane. When 84% of the theoretical amount of ammonia has been collected, the reaction is discontinued. The product is stripped at 120° C. under vacuum.

Example 27(a)

By the procedure of Example 26, a homopolymer of acrylonitrile is reacted with 1,2-diaminocyclohexane to give the corresponding substituted polyvinylimidazoline.

Example 27(b)

Example 26 is repeated substituting sulfur by thiobenzoic acid.

Example 27(c)

Example 26 is repeated substituting sulfur by thiobutyric acid.

Example 28(a)

To a reaction flask, there are charged 11.34 parts of a copolymer of acrylonitrile and vinylidene chloride (93.5:6.5 weight percent), corresponding to a content of 10.6 parts (0.2 mole) of acrylonitrile, 0.0768 part of sulfur, and 200 cc. of dimethyl sulfoxide. To the stirring, hot mixture, there is added dropwise 27.6 parts (0.46 mole) of ethylenediamine. After 21½ hours, 100% of the theoretical amount of ammonia has evolved, and any unreacted ethylenediamine is removed by distillation. The product, a copolymer of 2-vinylimidazoline and vinylidene chloride is stripped at 120° C. under vacuum.

The product melts at 234°–239° C. with evolution of gas.

Example 28(b)

The procedure of part (a) is repeated substituting sulfur by hydrogen sulfide.

Example 28(c)

The procedure of part (a) is repeated substituting sulfur by hydrogen selenide.

The following examples are illustrative of the usefulness of the polymers of the invention in water treatment. Table I lists the polymers referred to in the following tables, polymers 11 and 12 representing the prior art.

TABLE I

| Polymer | Brookfield Viscosity | Identification Number |
|---|---|---|
| Polyvinylimidazoline; mol. wt. about 230,000; free amine form | 5.75 | 1 |
| Polyvinylimidazoline; mol. wt. about 230,000; hydrogen chloride form | 18.0 | 2 |
| Polyvinylimidazoline; mol. wt. about 900,000; free amine form | 19.2 | 3 |
| Polyvinylimidazoline; mol. wt. about 900,000; hydrogen chloride form | 154.0 | 4 |
| Polyvinylimidazoline; mol. wt. about 2.7 million; free amine form | 15.0 | 5 |
| Polyvinylimidazoline; mol. wt. about 2.7 million; hydrogen chloride form | 1,550.0 | 6 |
| (Styrene-vinylimidazoline)copolymer (33/67) | 8.5 | 7 |
| Polyvinyl(tetrahydropyrimidine); mol. wt. about 270,000 | 2.5 | 8 |
| (Acrylamide-vinylimidazoline)copolymer (46.7/53.3) | 4.0 | 9 |
| (Vinyl acetate-vinylimidazoline)copolymer (12/88) | 5.25 | 10 |
| A low molecular weight polyamine cationic coagulant (Type A) | 1.25 | 11 |
| Another low molecular weight polyamine coagulant (Type B) | 1.50 | 12 |
| A high molecular weight poly-N-aminoalkylacrylamide | 80 | 13 |
| A very high modified poly-N-aminoalkylacrylamide | 1,600 | 14 |
| Poly(2-vinyl-4-methylimidazoline); mol. wt. 270,000 | 5.0 | 15 |
| (Ethyl acrylate-vinylimidazoline)copolymer (27/73) | 1.75 | 16 |
| (Vinylidene chloride-vinylimidazoline) copolymer (6.5/93.5) | 1.6 | 17 |
| (Trimethylcyclohexyl acrylatevinylimidazoline)copolymer (24/76) | 5.6 | 18 |
| Poly(2-vinyl-3-methylimidazoline); mol. wt. 270,000 | 3.25 | 19 |
| (Vinylbutyl ether-vinylimidazoline) copolymer (23/77) | 9.8 | 20 |

NOTE.—Viscosity=Brookfield Viscosity (cps.) 12 r.p.m., 25° C., 1% resin solids.

In reference to Tables II and III (see item 1) Water Clarification under Test Methods hereinbelow.

TABLE II.—COAGULANT AID ACTIVITY WATER CLARIFICATION

| Conditions | Average Turbidities at 0.5 Min. Settling Time | | |
|---|---|---|---|
| Test Water | 1 | 1 | 2 |
| Water Turbidity (p.p.m.) | 210 | 210 | 157 |
| Alum (p.p.m.) (optimum) | 25 | 25 | 25 |
| Clay (p.p.m.) (optimum) | 15 | 0 | 0 |
| See footnotes | (¹) | (²) | (³) |
| Coagulant Aid: | | | |
| 1 | 8.3 | 11.6 | |
| 2 | 9.5 | 9.2 | |
| 3 | 7.9 | 10.6 | 13.3 |
| 4 | 9.0 | 8.4 | |
| 11 | 18.1 | 24.2 | 33.5 |
| 12 | 19.0 | 16.2 | |
| Alum | | 74 | 55.0 |

[1] Average of the turbidities of the 0.1, 0.2 p.p.m. coagulant aid treatment.
[2] Average of the turbidities of the 0.2, 0.3 p.p.m. coagulant aid treatment.
[3] Average of the turbidities of the 0.2, 0.3, 0.4 p.p.m. coagulant aid treatment.

TABLE III.—WATER CLARIFICATION

| Polymer Coagulant Aid Identification Number | Amount (p.p.m.) | Clay (p.p.m.) | Alum (p.p.m.) | Residual Turbidity in Settling Time (in Min.) | | | |
|---|---|---|---|---|---|---|---|
| | | | | 0.5 | 1.5 | 5 | 15 |
| 1 | 0.1 | 15 | 25 | 13 | | 9.2 | 6.5 |
| 2 | 0.1 | 15 | 25 | 14 | | 10 | 6.5 |
| 3 | 0.1 | 15 | 25 | 12 | | 9.2 | 5.8 |
| 4 | 0.1 | 15 | 25 | 14 | | 10 | 6.5 |
| 11 | 0.1 | 15 | 25 | 22.5 | | 4.0 | 4.0 |
| 1 | 0.2 | 15 | 25 | 3.5 | | 2.5 | 2.0 |
| 2 | 0.2 | 15 | 25 | 5.0 | | 3.5 | 2.5 |
| 3 | 0.2 | 15 | 25 | 3.8 | | 3.8 | 2.5 |
| 4 | 0.2 | 15 | 25 | 4.0 | | 3.5 | 2.5 |
| 11 | 0.2 | 15 | 25 | 13.8 | | 7.0 | 1.8 |
| 1 | 0.2 | | 25 | 14.0 | 9.2 | 7.5 | 7.5 |
| 2 | 0.2 | | 25 | 11.0 | 8.2 | 6.5 | 6.5 |
| 3 | 0.2 | | 25 | 12.0 | 9.2 | 7.5 | 7.5 |
| 4 | 0.2 | | 25 | 9.2 | 7.5 | 6.5 | 6.5 |
| 11 | 0.2 | | 25 | 37.5 | 10 | 8.2 | 5.8 |
| 1 | 0.3 | | 25 | 9.2 | 8.2 | | 8.2 |
| 2 | 0.3 | | 25 | 7.5 | 7.5 | | 6.5 |
| 3 | 0.3 | | 25 | 9.2 | 8.2 | | 7.5 |
| 4 | 0.3 | | 25 | 7.5 | 7.5 | | 6.5 |
| 11 | 0.3 | | 25 | 11.0 | 9.2 | | 8.2 |

NOTE.—The initial water turbidity is 210 p.p.m.; pH 7.45. All amounts are given in p.p.m. and the settling time in minutes.

The data show that the polymers of the invention, when used as prime coagulant or a coagulant, in conjunction with other additives, are highly efficient in water clarification.

In reference to Table IV, see item 5) Kaolin Clay Suspension under Test Methods hereinbelow.

TABLE IV.—KAOLIN CLAY SUSPENSION FILTRATIONS

| Polymer Coagulant Aid (HCl Salt) (0.1% on Clay) | Brookfield Viscosity (cps.) 1% Solid (25° C.; 12 r.p.m.) | Filtration Time (Sec.) |
|---|---|---|
| 7 | 8.5 | 83 |
| 8 | 2.0 | 90 |
| 9 | 5.25 | 68 |
| 10 | 4.0 | 78 |
| 15 | 5.0 | 72 |
| 16 | 1.75 | 95 |
| 17 | 1.6 | 114 |
| 18 | 5.6 | 64 |
| 19 | 3.25 | 79 |
| 20 | 9.8 | 56 |
| None | | 580 |

TABLE V.—FILTRATION STUDIES

| Flocculant, Nature | Percent on Weight of Solids | Total Filter Time (Sec.) | |
|---|---|---|---|
| | | pH 7.0 | pH 12.0 |
| None | | 580 | 925 |
| 1 | 0.05 | 76 | 340 |
| 1 | .1 | 61 | 210 |
| 5 | 0.05 | 65 | 215 |
| 5 | .1 | 54 | 136 |
| 2 | 0.05 | 84 | 325 |
| 2 | 0.1 | 52 | 220 |
| 4 | 0.05 | 59 | 170 |
| 4 | 0.1 | 34 | 141 |
| 11 | 0.05 | 142 | |
| 11 | 0.1 | 118 | |
| 13 | 0.05 | 165 | 450 |
| 13 | 0.1 | 80 | 195 |

NOTE.—The filtration studies were carried out on suspensions of a high content of solid (10% Kaolin Clay) with 100 ml. of the suspension being filtered through a Baroid filter press at 4.7 lb./in.²/pressure.

In reference to Table VI, see item (4) under Test Methods hereinbelow.

TABLE VI

| Polymer 6, p.p.m. | Sediment Volume (Cm.) Time (Min.) | | | | | | | | | | |
|---|---|---|---|---|---|---|---|---|---|---|---|
| | 0.5 | 1 | 1.5 | 2 | 2.5 | 3 | 3.5 | 5 | 10 | 15 | 30 |
| 0 | 17.8 | 17.2 | 16.8 | 16.5 | 16 | 15.8 | 15.2 | 14.2 | 11.5 | 10 | 8.2 |
| 10 | 8 | 8 | 7.5 | 7 | 7 | ----- | 7 | 7 | 7 | 6.5 | 6.5 |
| 12 | 8 | 8 | 7.5 | 7.5 | 7.5 | 7.5 | 7.5 | 7.5 | ----- | 7.5 | 7 |

In reference to Table VII, see item (2) under Test Methods hereinbelow.

TABLE VII.—PLANT SEWAGE SLUDGE
[2.17% non-volatile solids]

| Filter Aid | | Filtrate | |
|---|---|---|---|
| Composition | Amount, percent on solids | Ml. | Gal./hr./sq. ft. |
| None | 0 | 59 | 2.66 |
| FeCl₃/Ca(OH)₂ | 11.3/25 | 273 | 12.28 |
| FeCl₃/Ca(OH)₂ | 14/31.2 | 375 | 16.87 |
| 1 | 1.75 | 280 | 12.6 |
| 2 | 1.75 | 1,140 | 51.3 |

The data show that small amounts of the polymers of the invention are effective in the filtration and clarification of spent biological sewage sludeg. Thus, important savings in filtration time, and thereby, in equipment are realized.

In further experiments with industrial sewage sludges, the polymers of the invention promoted settling of large or medium size flocs, a distinct advantage in industrial filtration and operations.

In reference to Table VIII, see item (3) under Test Methods hereinbelow.

TABLE VIII.—FILTRATION OF SEWAGE SLUDGE
[Sludge Solids=4.0%]

| Coagulant | Amount, percent on Solids | Filtrate | |
|---|---|---|---|
| | | Ml. | Gal./hr./sq. ft. |
| None | | 57/clear | 2.56 |
| FeCl₃/Ca(OH)₂ | 2.94/13.9 | 140/clear | 6.3 |
| FeCl₃/Ca(OH)₂ | 3.77/18.9 | 170/clear | 7.66 |
| FeCl₃/Ca(OH)₂ | 4.73/23.8 | 210/clear | 9.45 |
| FeCl₃/Ca(OH)₂ | 5.67/28.4 | 230/clear | 10.3 |
| 3 | 0.39 | 160/clear | 7.2 |
| 3 | 0.695 | 240/clear | 10.8 |
| 3 | 0.97 | 282/clear | 12.7 |
| 1 | 0.39 | 135/clear | 6.08 |
| 1 | 0.695 | 160/clear | 7.20 |
| 14 | 0.695 | 62/clear | 2.79 |
| 14 | 1.39 | 84/clear | 3.78 |

The sewage sludges used were from municipal sewage disposal plants. The data show the very satisfactory results obtained by the polymers of the invention, as compared to conventional filter aids, including other polymers, in coagulating and settling the suspended solids in sewage sludge.

Example 29

To a 500 ml. three-neck flask fitted with an addition funnel with a gas inlet adapter, stirrer, and reflux condenser with a gas exit tube leading to a water drop, are charged 22.3 parts (0.4 mole) of polyacrylonitrile, 2.0 parts of a commerical colloidal silica, 0.1536 part of sulfur (N.F.), and 200 parts of n-heptane. To the stirring, refluxing mixture, kept under a slow stream of nitrogen, 61.5 parts of ethylene diamine (0.92 mole) are added dropwise over a one-hour period. The mixture is refluxed until ammonia evolution has ceased (90%) in about 4 and ½ hours. The apparatus is then fitted with a Dean Stark trap and the unreacted ethylene diamine azeotropes into the receiver. The distillate separates into a lower diamine layer and an upper hydrocarbon layer which is allowed to run back into the reaction flask. After four hours and 85% of recovery of unreacted diamine is realized, the mixture is allowed to cool, is filtered and dried. The product, polyvinylimidazoline, is obtained as a light yellow, free-flowing solid in essentially quantitative yield. The product is soluble in water.

Example 30

The procedure of Example 29 is repeated but the colloidal silica is omitted. A polyvinylimidazoline polymer results.

Example 31

To a 500 ml. three-neck flask fitted with an addition funnel with a gas inlet adapter, stirrer, and reflux condenser with a gas exit tube leading to a water drop, are charged 22.3 parts (0.4 mole) of polyacrylonitrile, 2.0 parts of a commercial colloidal silica, 0.1536 part of sulfur (N.F.), and 200 parts of n-heptane. To the stirring, refluxing mixture, kept under a slow stream of nitrogen, 27.5 parts of ethylene diamine (0.46 mole) are added dropwise over a one-hour period, together with 1,3-diaminopropane. The product, a 2-vinyl-3,4,5,6-tetrahydropyrimidine-2-vinylimidazoline copolymer, is obtained.

Example 32

The procedure of Example 29 is repeated but sulfur is substituted by selenium sulfide to obtain the same polymer.

TEXT METHODS (1) Water clarification

*Modified jar test.*—Two-liter beakers equipped with stopcocks for removing samples two inches from the bottom are used throughout this study.

(a) While stirring the water to be treated at 100 r.p.m., alum is added to the set of beakers. This usually required about 30 sec. After the alum is all added, which is considered zero time, coagulant aid is added after one minute of stirring and clay in suspension, if used, is added after three minutes of stirring. The stirring at 100 r.p.m., is continued for a total of five minutes after the alum addition, whereupon it is reduced to 30 r.p.m. Stirring at 30 r.p.m. is continued for 15 minutes, then stopped, and samples are removed through the stopcock after 30, 90, 300, and 900 seconds. The turbidity of these samples is measured on a Hellige turbidimeter after shearing with a Hamilton Beach mixer.

The 30 second turbidity reading is used as an index of the size of the floc and its consequent rate of settling. Low values at 30 seconds indicate a large rapid settling floc. The 900 second turbidity gives an estimate of the quality of water which can be obtained by the particular treatment.

Optimum alum level in a particular water is determined by use of the test described above using varying alum levels. From these results, the best treatment, that is, fastest settling floc and lowest final turbidity, is chosen.

(b) The best clay level in any one water is chosen in much the same manner except that the optimum alum level and 0.3 p.p.m. of coagulant aid is used in conjunction with various levels of clays.

Prime coagulation indicates that the polymer is added to the turbid water as the sole coagulant, then the above procedure is followed.

FILTRATION OF SEWAGE SLUDGES (2) Plant wash

*Activated sewage sludge treatment.*—Several portions of a digested sewage sludge containing 1–5 parts of suspended matter of predominantly organic character per 100 cc. volume and having a pH of 7.2 are treated with different amounts of flocculating agents of the invention, and two portions are treated with ferric chloride (FeCl₃) and lime (Ca(OH)₂) (both the indicated percentages based on weight of suspended matter) for comparative purposes. The treated portions are then filtered using a vacuum leaf filter provided with a nylon filter cloth at 74° F. under 22 inches Hg vacuum using a 1.0 minute form period, a 2.0 minute drying period, and a 0.5 minute discharge period.

(3) Digested sewage sludge

Several portions of a digested sewage sludge, containing 1–10 parts of suspended matter of predominantly organic character per 100 cc. volume and having a pH of 7.2 are treated with different amounts of polymer and other portions are treated with various amounts of a mixture of ferric chloride and lime, and still one additional portion is treated with a mixture of the polymer with ferric chloride and lime. The treated portions are then filtered using a vacuum leaf filter provided with a polyethylene filter cloth at 74° F. under 22 inches Hg vacuum, using a one-minute form period, a two-minute drying period, and a 0.5-minute discharge period.

(4) Activated waste sewage sludge from sewage disposal plant

Suspended solids in the sewage sludge: 4700 p.p.m.
Equipment:
Phipps-Bird "Jar Test" Stirring Apparatus Four three-liter beakers Approximately 8200 cc. of waste activated sludge are added to each of the four three-liter beakers graduated in centimeters. Solutions of coagulant aid are added to the slurries prior to stirring for two minutes at 80 r.p.m. The stirring is then stopped and the sediment volume is then measured as a function of time. From these results, optimum coagulant levels are determined.

(5) Kaolin clay suspension

Filtration times of aqueous kaolin clay suspensions containing 10 grams of kaolin per 100 cc. of suspension and having variou pH values are measured when various amounts (on the weight of kaolin) of polymer are added to separate portions of the suspension and compared with a control. Filtration pressure=24.3 cms. Hg.

The polymers of the invention are also useful when used in admixture with other polymeric water treating aids, such as high molecular weight polyamine coagulants, polyacrylamide coagulants, and others with which they may evidence a synergistic effect.

The polymers of the invention containing units of Formula I hereinabove evidence good film forming properties. The films are clear, hygroscopic, readily soluble in water, and in solvents, such as ethanol, isopropyl alcohol, methanol, and other polar solvents.

The polymers have desirable properties that suit them well for propellant type hair sprays. For instance, a polyvinylimidazoline dissolved in a concentration of 0.5% in a 80/20 mixture of ethylene dichloride/ethanol mixture is a useful hair spray.

The polymers of the invention are useful thickeners for acid systems in industrial acids, as hydrochloric acids, used in cleaning operations for metals where they can advantageously be used on vertical and curved surfaces.

The polymers of this invention, in particular the polyvinylimidazolines, are useful as anchoring agents for resinous compositions in the treatment of cellulosic fibrous materials. They promote the retention and deposition of polymeric compositions on fibrous products, such as pulp. In such applications, the polyvinylimidazoline polymers of the invention can be used in amounts ranging from as little as 0.1 to 10% or more based on the weight of the pulp, preferably they are effectively used in amounts in the range of 0.2 to 0.5%. In the treatment of the fibrous material, the polyvinylimidazoline of the invention can be added before, with, or after the treatment with the other polymer or incrementally at all of these three periods. Preferably, the polyvinylimidazoline is added to the cellulosic material prior to treatment with the other resin. The type of linear polymers which may be used to treat the cellulosic materials are known in the art. Typical are those disclosed in United States Patent No. 2,765,229, column 4. This patent is incorporated herein by reference.

Particularly valuable resin dispersions useful for the treatment of cellulosic materials comprise a mixture of (a) one or more monomeric esters of acrylic and/or methacrylic acid and (b) monomeric arcylic, methacrylic and itaconic acid or mixtures of these acids in water and polymerizing the mixture while it is in the emulsified form. The monomeric esters of acrylic and methacrylic acids, which have proven to be most satisfactory, are the alkyl esters in which the alkyl group contains 1 to 8 carbon atoms and which are exemplified by the following: methyl, ethyl, n-propyl, isopropyl, n-butyl, isobutyl, sec-butyl, tert-butyl, isoamyl, tert-amyl, hexyl, heptyl, n-octyl, and 2-ethylhexyl acrylates and methacrylates and isomers of these. From 0.25% to 5% on a weight basis, preferably from 0.5% to 2%, of the acid is employed.

The polyvinylimidazolines which are useful in this type of application for the treatment of pulp generally are of a low molecular weight, such as in the range of 20,000 to 60,000 average molecular weight, preferably in the range of 40,000 to 50,000. In conjunction with the polymers, other conventional polymers may be employed in the treatment of the pulp, such as alum and the like.

It is to be understood that changes and variations may be made without departing from the spirit and scope of the invention as defined in the appended claims.

We claim:

1. A process which comprises agitating a mixture of a particulate polymer of acrylonitrile or methacrylonitrile containing from about 50 to 100 mole percent of nitrile-containing units in the polymer in an organic liquid medium, which is a non-solvent for the polymer and for polymers derived therefrom by reaction with a polyamine defined hereinafter, containing as a catalyst and in catalytic amount, sulfur or a sulfur-containing compound containing a thiol group or capable of forming a thiol group under the reaction conditions, introducing at least one polyamine selected from those of the formulas

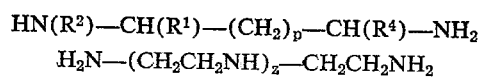

in an amount in the range from that which is approximately stoichiometrically equivalent to the nitrile-containing units of the initial polymer to a substantial excess, and heating the mixture at a temperature of at least 75° C. until there is produced a water-soluble particulate polymer containing from 50 to 100 mole percent of units of the formula

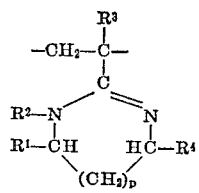

the meaning of the symbols in the formulas being as follows:

$p$ is 0 or 1,
$R^1$ is hydrogen or an alkyl group,
$R^2$ is hydrogen, phenyl, benzyl, alkyl or

in which $z$ is 1 to 4
$R^3$ is hydrogen or methyl, and
$R^4$ is hydrogen or an alkyl group.

2. A process which comprises agitating a mixture of a particulate polymer of acrylonitrile or methacrylonitrile containing from about 90 to 100 mole percent of nitrile-containing units in the polymer in a hydrocarbon liquid medium, which is a non-solvent for the polymer and for polymers derived therefrom by reaction with a polyamine defined hereinafter, containing as a catalyst and in catalytic amount, sulfur or a sulfur-containing compound containing a thiol group or capable of forming a thiol group under the reaction conditions, introducing at least one polyamine selected from those of the formulas

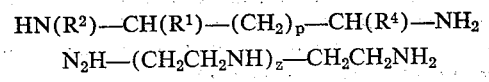

in an amount in the range from that which is approximately stoichiometrically equivalent to the nitrile-containing units of the initial polymer to a substantial excess, and heating the mixture at a temperature of at least 75° C. until there is produced a water-soluble particulate polymer containing from 90 to 100 mole percent of units of the formula

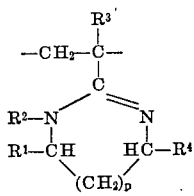

the meaning of the symbols in the formulas being as follows:

$p$ is 0 or 1,
$R^1$ is hydrogen or an alkyl group,
$R^2$ is hydrogen, phenyl, benzyl, alkyl, or

in which $z$ is 1 to 4,
$R^3$ is hydrogen or methyl, and
$R^4$ is hydrogen or an alkyl group.

3. A process which comprises agitating a mixture of a particulate polyacrylonitrile in an organic liquid medium, which is a non-solvent for the polymer and for polymers derived therefrom by reaction with ethylenediamine, containing as a catalyst and in catalytic amount, sulfur or a sulfur-containing compound containing a thiol group or capable of forming a thiol group under the reaction conditions, adding ethylenediamine in excess of the amount equivalent to the nitrile groups of the polymer and heating the mixture at a temperature of at least 75° C. until there is obtained a water-soluble polymer of 90 to 100 mole percent of 2-vinylimidazoline.

4. A process which comprises agitating a mixture of a particulate polymer of acrylonitrile or methacrylonitrile containing from about 10 to 100 mole percent of nitrile-containing units in the polymer in an organic aliphatic hydrocarbon liquid medium, which is a non-solvent for the polymer and for polymers derived therefrom by reaction with a polyamine defined hereinafter, containing, as a catalyst and in catalytic amount, elemental sulfur or a sulfur-containing compound containing a thiol group or capable of forming a thiol group under the reaction conditions, introducing at least one polyamine selected from those of the formulas

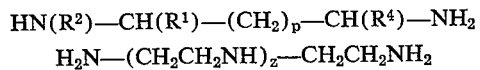

in an amount in the range from that which is approximately stoichiometrically equivalent to the nitrile-containing units of the initial polymer to a substantial excess, and heating the mixture at a temperature of at least 75° C. until there is produced an essentially uncrosslinked particulate polymer containing from 10 to 100 mole percent of units of the formula

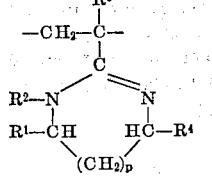

the meaning of the symbols in the formulas being as follows:

$p$ is 0 or 1,
$R^1$ is hydrogen or an alkyl group,
$R^2$ is hydrogen, phenyl, benzyl, alkyl, or —$(CH_2CH_2NH)_zH$ in which $z$ is 1 to 4,
$R^3$ is hydrogen or methyl, and
$R^4$ is hydrogen or an alkyl group.

5. A process which comprises agitating a mixture of a particulate polymer of acrylonitrile or methacrylonitrile containing from about 10 to 100 mole percent of nitrile-containing units in the polymer in an organic liquid medium, which is a non-solvent for the polymer and for polymers derived therefrom by reaction with a polyamine defined hereinafter, containing colloidal silica and, as a catalyst and in catalytic amount, elemental sulfur or a sulfur-containing compound containing a thiol group or capable of forming a thiol group under the reaction conditions, introducing at least one polyamine selected from those of the formulas HN($R^2$)—CH($R^1$)—$(CH_2)_p$—CH($R^4$)—$NH_2$ $H_2N$—$(CH_2CH_2NH)_z$—$CH_2CH_2NH_2$ in an amount inthe range from that which is approximately stoichiometrically equivalent to the nitrile-containing units of the initial polymer to a substantial excess, and heating the mixture at a temperature of at least 75° C. until there is produced an essentially uncrosslinked particulate polymer containing from 10 to 100 mole percent of units of the formula

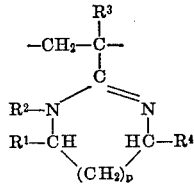

the meaning of the symbols in the formulas being as follows:

$p$ is 0 or 1,
$R^1$ is hydrogen or an alkyl group,
$R^2$ is hydrogen, phenyl, benzyl, alkyl, or —$(CH_2CH_2NH)_zH$ in which $z$ is 1 to 4,
$R^3$ is hydrogen or methyl, and
$R^4$ is hydrogen or an alkyl group.

6. A process which comprises agitating a mixture of a particulate polymer of acrylonitrile or methacrylonitrile containing from about 10 to 100 mole percent of nitrile-containing units in the polymer in an organic liquid medium, which is a non-solvent for the polymer and for polymers derived therefrom by reaction with a polyamine defined hereinafter, containing thioacetamide as a catalyst and in catalytic amount, introducing at least one polyamine selected from those of the formulas

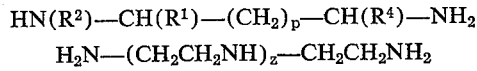

in an amount in the range from that which is approximately stoichiometrically equivalent to the nitrile-containing units of the initial polymer to a substantial excess, and heating the mixture at a temperature of at least 75° C. until there is produced an essentially uncrosslinked particulate polymer containing from 10 to 100 mole percent of units of the formula

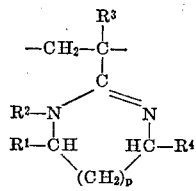

the meaning of the symbols in the formulas being as follows:

$p$ is 0 or 1,
$R^1$ is hydrogen or an alkyl group,
$R^2$ is hydrogen, phenyl, benzyl, alkyl, or —$(CH_2CH_2NH)_zH$ in which $z$ is 1 to 4,
$R^3$ is hydrogen or methyl, and
$R^4$ is hydrogen or an alkyl group.

7. As a composition of matter, a water-soluble salt of a polymer of monoethylenically unsaturated molecules comprising about 50 to 100 mole percent of at least one monomer of the formula

with an organic or inorganic acid or an acidic salt of such acid, the meaning of the symbols in the formula being as follows:

$p$ is 0 or 1,
$R^1$ is hydrogen or an alkyl group,
$R^2$ is hydrogen, phenyl, benzyl, an alkyl group, or $(CH_2CH_2NH)_zH$ wherein $z$ is 1 to 4,
$R^3$ is hydrogen or methyl, and
$R^4$ is hydrogen or an alkyl group.

8. A polymer salt according to claim 7 in which the cation is that of sulfuric acid or of an alkali metal bisulfate.

9. As a composition of matter, an aqueous solution of a salt of a polymer according to claim 7.

10. A polymer salt according to claim 7 in which the polymer has a molecular weight of at least 20,000.

11. As a composition of matter, a water-soluble salt of a polymer of monoethylenically unsaturated molecules comprising about 50 to 100 mole percent of 2-vinylimidazoline with an organic or inorganic acid or with an acidic salt of such an acid.

12. As a composition of matter, a water-soluble salt of poly(2-vinylimidazoline).

13. As a composition of matter, a water-soluble polymer of monoethylenically unsaturated molecules which polymer comprises 90 to 100 mole percent of at least one unit of the formula

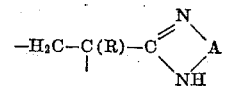

wherein A is a $(C_2$—$C_3)$-alkylene group having at least 2 carbon atoms extending in a chain between the adjoined N atoms, and R is H or $CH_3$.

14. A polymer in accordance with claim 13 which has a molecular weight of at least about 230,000.

15. As a composition of matter, an aqueous solution of the polymer defined in claim 13.

16. As a composition of matter, a water-soluble polymer of monoethylenically unsaturated molecules which polymer comprises 50 to 100 mole percent of units of the formula

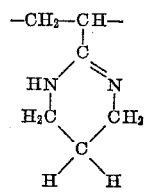

17. As a composition of matter, a water-soluble polymer of monoethylenically unsaturated molecules which polymer comprises 90 to 100 mole percent of units of the formula

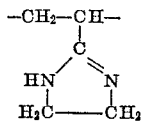

18. A composition of matter according to claim 17 in which the water-soluble polymer has a molecular weight of at least about 230,000.

19. As a composition of matter, an aqueous solution of a water-soluble salt of a polymer defined in claim 17 with sulfuric acid or an alkali metal bisulfate.

References Cited

UNITED STATES PATENTS

| | | | |
|---|---|---|---|
| 2,606,175 | 8/1952 | Price | 260—868 |
| 2,643,990 | 6/1953 | Ham | 260—85.5 |
| 3,210,571 | 10/1965 | Sawa et al. | 260—88.7 |
| 2,688,008 | 8/1954 | Chaney | 260—79.5 |
| 2,726,132 | 12/1955 | Craig | 260—88.7 |
| 2,826,566 | 3/1958 | Bruson | 260—85.5 |
| 2,826,567 | 3/1958 | Bruson | 260—85.5 |
| 2,840,447 | 6/1958 | Green | 260—29.6 |
| 3,057,812 | 10/1962 | Straughan | 260—29.6 |

FOREIGN PATENTS

| | | |
|---|---|---|
| 467,179 | 5/1957 | Canada. |
| 700,172 | 11/1953 | Great Britain. |

MURRAY TILLMAN, *Primary Examiner.*

PAUL LIEBERMAN, *Assistant Examiner.*